R. A. & W. P. GILL & C. A. BURKE.
MACHINE FOR SIZING FRUIT.
APPLICATION FILED MAR. 10, 1915.
1,159,208.
Patented Nov. 2, 1915.
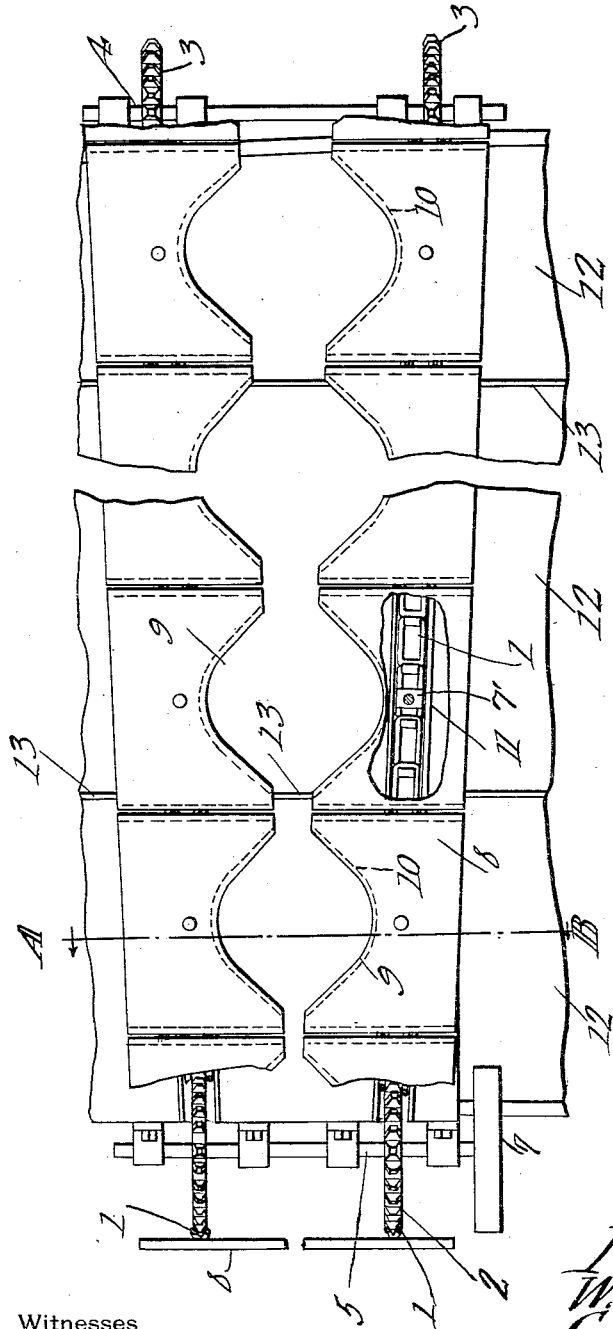
R. A. Gill,
W. P. Gill, AND
C. A. Burke, Inventors

UNITED STATES PATENT OFFICE.

ROBERT A. GILL AND WILLIAM P. GILL, OF PORT CLINTON, AND CORDELIA A. BURKE, OF GYPSUM, OHIO.

MACHINE FOR SIZING FRUIT.

1,159,208.  Specification of Letters Patent.  Patented Nov. 2, 1915.

Application filed March 10, 1915. Serial No. 13,404.

*To all whom it may concern:*

Be it known that we, ROBERT A. GILL, WILLIAM P. GILL, and CORDELIA A. BURKE, citizens of the United States, the said ROBERT A. GILL and WILLIAM P. GILL residing in Port Clinton and the said CORDELIA A. BURKE residing at Gypsum, both in the county of Ottawa and State of Ohio, have invented a new and useful Machine for Sizing Fruit, of which the following is a specification.

This invention relates to machines for sizing fruit such as apples, one of the objects of the invention being to provide continuously moving belts having means combined therewith whereby fruit of different sizes, when deposited thereon will be conveyed above bins or other suitable receivers and will be graded according to size, all the fruit of one grade dropping into one bin or receiver while fruit of another size will be conveyed to and deposited within a bin or receiver provided therefor.

A further object is to provide a fruit sizing machine which is simple, durable and efficient in construction and can be readily operated.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine, parts being broken away. Fig. 2 is a section on line A—B Fig. 1.

Referring to the figures by characters of reference 1 designates endless link belts each of which is mounted on sprockets 2 and 3. The two link belts diverge slightly in one direction and the sprockets 3 are mounted on a shaft 4 or in any other suitable manner, while the sprockets 2 are mounted on a shaft 5. Either one of the shafts 4 and 5 may be driven in any desired manner, as by means of a pulley 7.

The link belts 1 are of that type in which certain of the links are provided with upstanding yokes or bosses 7' and secured to these bosses by rivets or the like are plates 8 the inner sides of which are cut away as at 9 and the plates on each belt are directly opposite the plates on the opposed belt. Furthermore all of the plates on each belt are arranged close together. If desired, and as shown in Fig. 2, the several plates can have their inner and side edges downturned, as indicated particularly at 10, thus to prevent injury to the fruit.

The upper flights of the belts 1 are mounted within channeled guides 11 so that lateral shifting of the belts relative to each other is prevented. Bins or chutes 12 are arranged under the belts and are separated by partitions 13.

The recesses 9 in the plates 8 are so proportioned that when two opposed plates are brought together, the recesses in said plates will form an opening designed to permit the discharge therethrough of apples or other fruit of the smallest grade. However, as the plates travel with the belts longitudinally above the guide channels 11, they will be moved apart gradually so that when they arrive at different points along the path of travel, fruit of different sizes will be permitted to drop through them. Thus by disposing chutes, bins or other forms of receivers 12 under the machine, the fruit when placed upon the conveyer made up of the belts and plates will rest upon the inner ends of the plates until the openings between said ends are of sufficient size to permit the fruit thereabove to fall therethrough.

Obviously a machine such as described will constitute an efficient means for grading fruit according to size.

What is claimed is:—

The combination with straight channeled guides extending along diverging lines, of endless chain belts having their upper flights removably mounted within the channeled guides, plates secured to the respective chain belts and extending thereover, the plates on each belt being directly opposite to the plates on the opposed belt to form pairs, the inner ends of the plates being provided with recesses the walls of which are downturned.

In testimony that we claim the foregoing as our own, we have hereto affixed our signatures in the presence of two witnesses.

ROBERT A. GILL.
WM. P. GILL.
CORDELIA A. BURKE.

Witnesses:
B. C. RICHARDSON,
F. L. CLARY.

Copies of this patent may be obtained for five cents each, by addressing the "Commissioner of Patents, Washington, D. C."